United States Patent
Kalevo et al.

(10) Patent No.: US 11,023,401 B2
(45) Date of Patent: Jun. 1, 2021

(54) DATA COMMUNICATION SYSTEM

(71) Applicant: GURULOGIC MICROSYSTEMS OY, Turku (FI)

(72) Inventors: Ossi Kalevo, Akaa (FI); Tuomas Kärkkäinen, Turku (FI); Mikko Sahlbom, Perniö (FI); Jouni Laine, Turku (FI)

(73) Assignee: Gurulogic Microsystems Oy, Turku (FI)

( * ) Notice: Subject to any disclaimer, the term of this patent is extended or adjusted under 35 U.S.C. 154(b) by 0 days.

(21) Appl. No.: 16/636,176

(22) PCT Filed: Jul. 30, 2018

(86) PCT No.: PCT/EP2018/070618
§ 371 (c)(1),
(2) Date: Feb. 3, 2020

(87) PCT Pub. No.: WO2019/025376
PCT Pub. Date: Feb. 7, 2019

(65) Prior Publication Data
US 2020/0371979 A1    Nov. 26, 2020

(30) Foreign Application Priority Data
Aug. 4, 2017   (GB) .................................... 1712601

(51) Int. Cl.
*G06F 13/38*   (2006.01)
*G06F 13/40*   (2006.01)
(Continued)

(52) U.S. Cl.
CPC ........ *G06F 13/382* (2013.01); *G06F 13/4063* (2013.01); *H04L 63/0471* (2013.01);
(Continued)

(58) Field of Classification Search
CPC .......... G06F 13/385; G06F 13/134063; G06F 13/36; G06F 13/38; G06F 13/40;
(Continued)

(56) References Cited

U.S. PATENT DOCUMENTS 8,028,039 B1 *   9/2011   Hawkins ............... G06F 16/178
                                                            709/219
2002/0174180 A1 *  11/2002  Brown ................ G06F 16/1787
                                                            709/203
(Continued)

FOREIGN PATENT DOCUMENTS

GB    2538052 A    11/2016

OTHER PUBLICATIONS

GB Intellectual Property office, Combined Search Report under Section 17(5)(b) and Abbreviated Examination Report under Section 18(3), Application No. GB1712601.2, dated Sep. 29, 2017, 3 Pages.
(Continued)

*Primary Examiner* — Raymond N Phan
(74) *Attorney, Agent, or Firm* — Ziegler IP Law Group, LLC

(57) ABSTRACT

A system for communicating data from a source device to a destination device where the source device has no direct access or has only restricted access to any data communication network. The system includes a network device that is to be coupled in communication with the source device, thereby enabling the source device to transfer to the network device the data to be communicated. The system also includes a network node configured to provide a network node service to a source client executing on the network device and to a destination client associated with the destination device. The network device is to be coupled in communication with the network node via a data commu-
(Continued)

nication network. The source client is configured to communicate the data to the destination device, by relaying the data through the network node service, when the destination client is connected to the network node service.

22 Claims, 4 Drawing Sheets

(51) Int. Cl.
*H04L 29/06* (2006.01)
*H04L 29/08* (2006.01)

(52) U.S. Cl.
CPC ............ *H04L 67/06* (2013.01); *H04L 67/325* (2013.01); *G06F 2213/0042* (2013.01)

(58) Field of Classification Search
CPC .... G06F 13/4068; G06F 21/10; G06F 21/606; G06F 15/163; G06F 13/382; H04L 9/0838; H04L 9/321; H04L 9/3263; H04L 9/3273
See application file for complete search history.

(56) References Cited

U.S. PATENT DOCUMENTS

| | | |
|---|---|---|
| 2009/0100349 A1 | 8/2009 | Hancock |
| 2009/0276829 A1 | 11/2009 | Sela et al. |
| 2010/0217871 A1 | 8/2010 | Gammon |

OTHER PUBLICATIONS

Patent Cooperation Treaty, Notification of Transmittal of The International Preliminary Report on Patentability (PCT Rule 71.1), Application No. PCT/EP2018070618, dated Jul. 1, 2019, 8 Pages.
GB Intellectual Property Office, Examination Report under Section 18(3), Application No. GB1712601.2, dated Jan. 25, 2018, 3 pages.
GB Intellectual Property Office, Examination Report under Section 18(3), Application No. GB1712601.2, dated Jun. 28, 2018, 5 pages.
International Search Report, Application No. PCT/EP2018/070618, dated Nov. 29, 2018, 3 pages.
European Patent Office, Communication under Rule 71(3) EPC, Application No. 18753102.5, dated Dec. 3, 2020, 7 pages.
Granted Text, 'Data Communication with Devices Having no Direct Access or Only Restricted Access to Communication Networks', Application No. 18753102.5, (Marked Copy), 44 pages.
Granted Text, 'Data Communications with Devices Having no Direct Access or Only Restricted Access to Communication Networks', Application No. 18753102.5, (Clean Copy), 44 pages.

\* cited by examiner

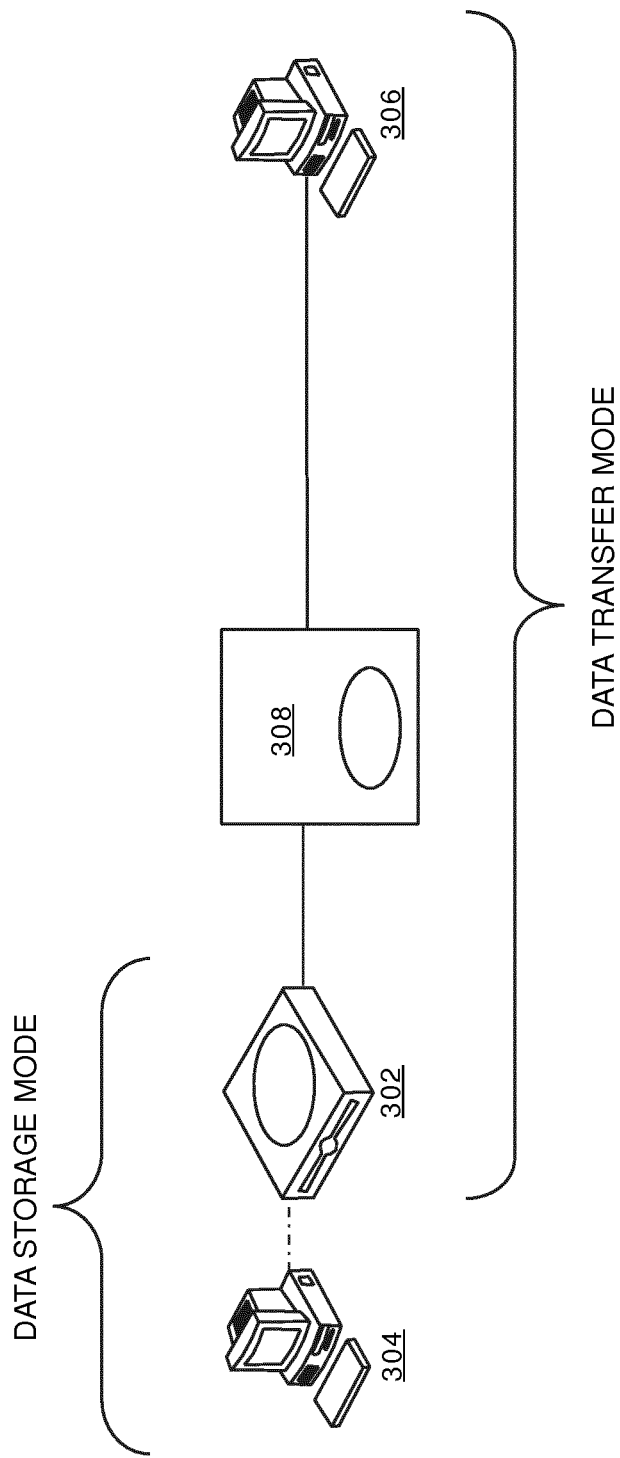

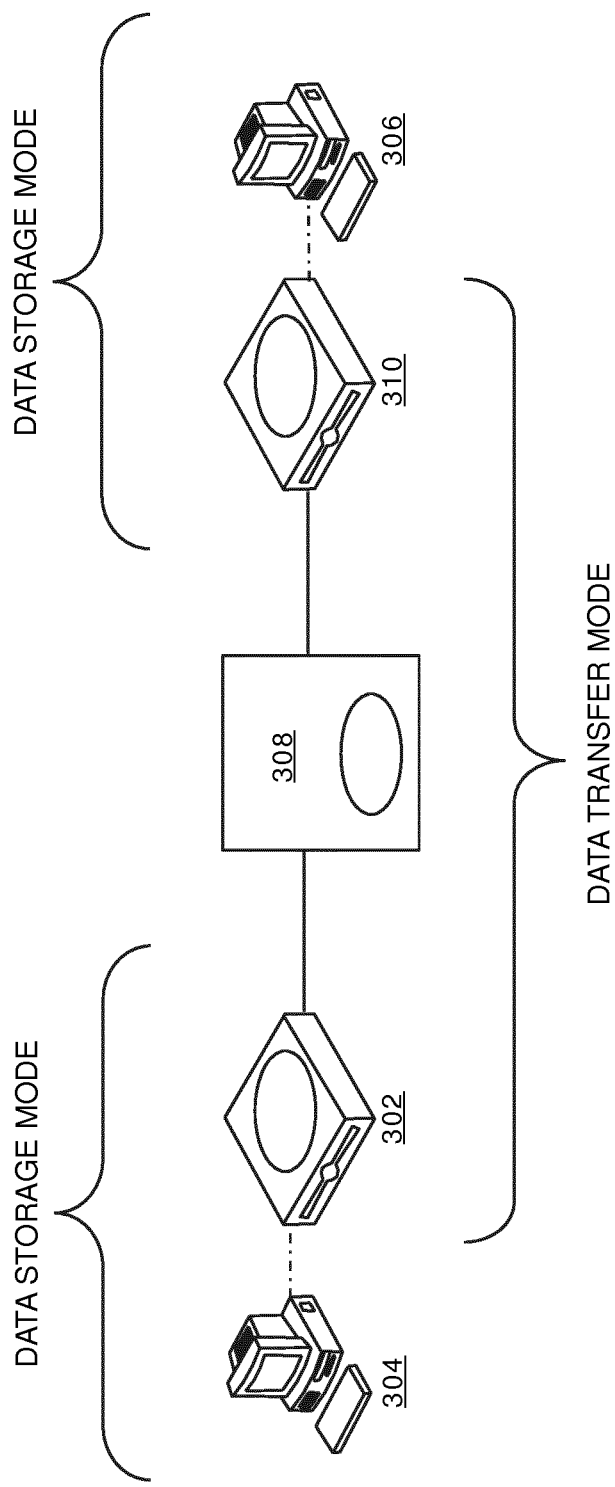

DATA COMMUNICATION SYSTEM

TECHNICAL FIELD

The present disclosure relates to systems for communicating data from a source device to a destination device, when the source device has no direct access or has only restricted access to any data communication network. Moreover, the present disclosure is concerned with methods of communicating data from a source device to a destination device, when the source device has no direct access or has only restricted access to any data communication network. Furthermore, the present disclosure is concerned with computer program products comprising a non-transitory computer-readable storage medium having computer-readable instructions stored thereon, the computer-readable instructions being executable by a computerized device comprising processing hardware to execute aforesaid methods.

BACKGROUND

There often arises a need to transfer data files securely from a source device to a destination device located far away from the source device, when the source device is not connected to the public Internet or has a restricted connection to the public Internet, for example, due to firewalls or anti-malware software. As an example, users of medical imaging devices (for example, doctors and their assistants) often need to transfer medical images from the medical imaging devices to other locations for analysis or research purposes.

Conventionally, these medical images are transferred using fax machines or a postal service. Such conventional approaches are not only sub-optimal, but also time-consuming and cumbersome. For this reason, it is very common for doctors and their assistants to copy data files containing medical images into an external hard drive or a Universal Serial Bus (USB) data memory stick, and to try to use other kinds of conventional approaches for transferring the data files.

Moreover, it is known that Autosync Dropbox®—Dropsync application allows a user to sync automatically and to share unlimited files and folders stored on a user device with Dropbox® and with the user's other devices. The files are transferred from the user device over a Universal Serial Bus (USB) to a data storage of a smartphone running the Dropsync application, which then automatically transmits the data by utilizing a data communication network provided by the smartphone. In such a case, the user device is capable of connecting to the data communication network provided by the smartphone, and therefore, is vulnerable to virus attacks and other kinds of threats.

In a published United States patent document US 2009/0100349 A1 (Jon W. Hancock; "Terminal Client Collaboration and Relay Systems and Methods"), there are described a systems and methods that enable collaboration in interactive sessions. A first connection is established between a terminal client and a relay service and the terminal client engages in an interactive session with a terminal service. A second connection is established between a shadow client and the relay service, wherein data and commands are relayed between the terminal client and the shadow client through the relay service, The first and second connections and the interactive session are encrypted. The interactive session is encrypted using different encryption keys than the keys used by the first and second connections.

In a published United States patent document US 2009/0276829 A1 (Rotem Sela et al; "System for Copying Protected Data from One Secured Storage Device to Another via a Third Party"), there is described a third party configuration to establish a virtual secure channel between a source SSD and a destination SSD via which the third party reads protected digital data from the source SSD and writes the protected digital data into the destination SSD after determining that each party satisfies eligibility prerequisites. An SSD is configured to operate as a source SSD, from which protected data is copied to a destination SSD, and also as a destination SSD, to which protected data of a source SSD is copied.

In a published United States patent document US 2010/0217871 A1 (Scott P. Gammon; "System and Method for Using a Portable Electronic Device as a Secure Virtual Mass Storage Device Over a Network"), there is described a wireless device. The wireless device comprises a processor for controlling operation of the wireless device; a first input device coupled to the processor for accepting an input; one display device coupled to the processor for communicating an output to the user; a communications subsystem coupled to the processor for communicating with a communications network; a universal Serial Bus (USB) storage device connected to a USB port of the wireless device; a memory coupled to the processor; and a storage device coupled to the processor. The wireless device includes a USB/network handling module resident in the memory for execution by the processor. The USB/network handling module is configured to establish a secure connection between the wireless device and a server of a network; load a universal serial bus mass storage component; initiate a file share between the wireless device and the server; and mount the USB storage device connected to the USB port of the wireless device as a shared network drive on the network.

In a granted GB patent document GB2538052 A (Gurulogic Microsystems Oy; "Encoder, Decoder, Encryption system, Encryption Key Wallet and Method"), there is described an encryption system for encrypting data in respect of at least one party. The party is provided with an encryption key wallet, wherein one or more encryption keys of the encryption key wallet are identifiable using one reference code. The encryption key wallet is opened for accessing at least one encryption key via its reference code, for encrypting data to generate corresponding encrypted data and/or for decrypting encrypted data to generate corresponding decrypted data.

In light of the foregoing, there arises a contemporary need for a system that is capable of facilitating data communication between a source device and a destination device, even when the source device has no direct access or has only restricted access to any data communication network.

SUMMARY

The present disclosure seeks to provide an improved system for communicating data from a source device to a destination device, when the source device has no direct access or has only restricted access to any data communication network.

Moreover, the present disclosure seeks to provide an improved method of communicating data from a source device to a destination device, when the source device has no direct access or has only restricted access to any data communication network.

A further aim of the present disclosure is to at least partially overcome at least some of the problems of the prior art, as described in the foregoing.

In a first aspect, embodiments of the present disclosure provide a system for communicating data from a source device to at least one destination device, the source device having no direct access or having only restricted access to any data communication network, characterized in that the system comprises:
- a network device that is to be coupled in communication with the source device, so as to enable the source device to transfer to the network device the data to be communicated to the at least one destination device; and
- a network node configured to provide a network node service to a source client executing on the network device and to a destination client associated with the at least one destination device, wherein the network device is to be coupled in communication with the network node via a data communication network, and wherein the network device is communicably uncoupled from the source device prior to communicably coupling the network device to the network node, wherein the source client is configured to:
- check whether or not the destination client is connected to the network node service; and
- communicate the data to the destination client, by relaying the data through the network node service, when the destination client is connected to the network node service, wherein the data communication from the source client to the destination client does not take place, until the network device has been communicably uncoupled from the source device.

Embodiments of the present disclosure are of advantage in that the system enables data communication with devices that have no direct access or have only restricted access to any data communication network, and facilitates the data communication in real time or near real time when clients associated with destination devices are connected to the network node service.

In the foregoing, by "no direct access" is meant that the source device is not capable of being, or is not desired to be, coupled directly to any data communication network by means of a wired or wireless connection.

Moreover, in the foregoing, by "only restricted access" is meant that the source device is capable of being coupled directly to a given data communication network, but for some reason, is not able to access the given data communication network at a given point of time. In some implementations, the term "restricted access" means that the source device is not allowed to access any data communication network. In other implementations, the term "restricted access" means that the source device is allowed to access only a particular communication network (for example, a local area network of an organization or a virtual private network), whereby the source device is unable to communicate data to the at least one destination device from outside that particular communication network.

In a second aspect, embodiments of the present disclosure provide a method of communicating data from a source device to at least one destination device, the source device having no direct access or having only restricted access to any data communication network, the method being implemented by a system comprising a network node and a network device, characterized in that the method comprises:
- coupling the network device in communication with the source device to enable the source device to transfer to the network device the data to be communicated to the at least one destination device;
- coupling the network device in communication with the network node via a data communication network;
- communicably uncoupling the network device from the source device prior to communicably coupling the network device to the network node;
- providing, via the network node, a network node service to a source client executing on the network device and to a destination client associated with the at least one destination device;
- checking whether or not the destination client is connected to the network node service; and
- communicating the data from the source client to the destination client, by relaying the data through the network node service, when the destination client is connected to the network node service, wherein the data communication from the source client to the destination client does not take place, until the network device has been communicably uncoupled from the source device.

In a third aspect, embodiments of the present disclosure provide a network device for communicating data from a source device to at least one destination device, the source device having no direct access or having only restricted access to any data communication network, characterized in that:
- the network device is to be coupled in communication with the source device, so as to enable the source device to transfer to the network device the data to be communicated to the at least one destination device;
- the network device is to be coupled in communication with a network node via a data communication network, wherein the network device is communicably uncoupled from the source device prior to communicably coupling the network device to the network node, and wherein the network node is configured to provide a network node service to a source client executing on the network device and to a destination client associated with the at least one destination device; and
- the source client is configured to check whether or not the destination client is connected to the network node service, and to communicate the data to the destination client, by relaying the data through the network node service, when the destination client is connected to the network node service, wherein the data communication from the source client to the destination client does not take place, until the network device has been communicably uncoupled from the source device.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 3A and 3B are schematic illustrations of how a network device is used to communicate data from a source device to a destination device in different scenarios, in accordance with an embodiment of the present disclosure.

Figure 1:
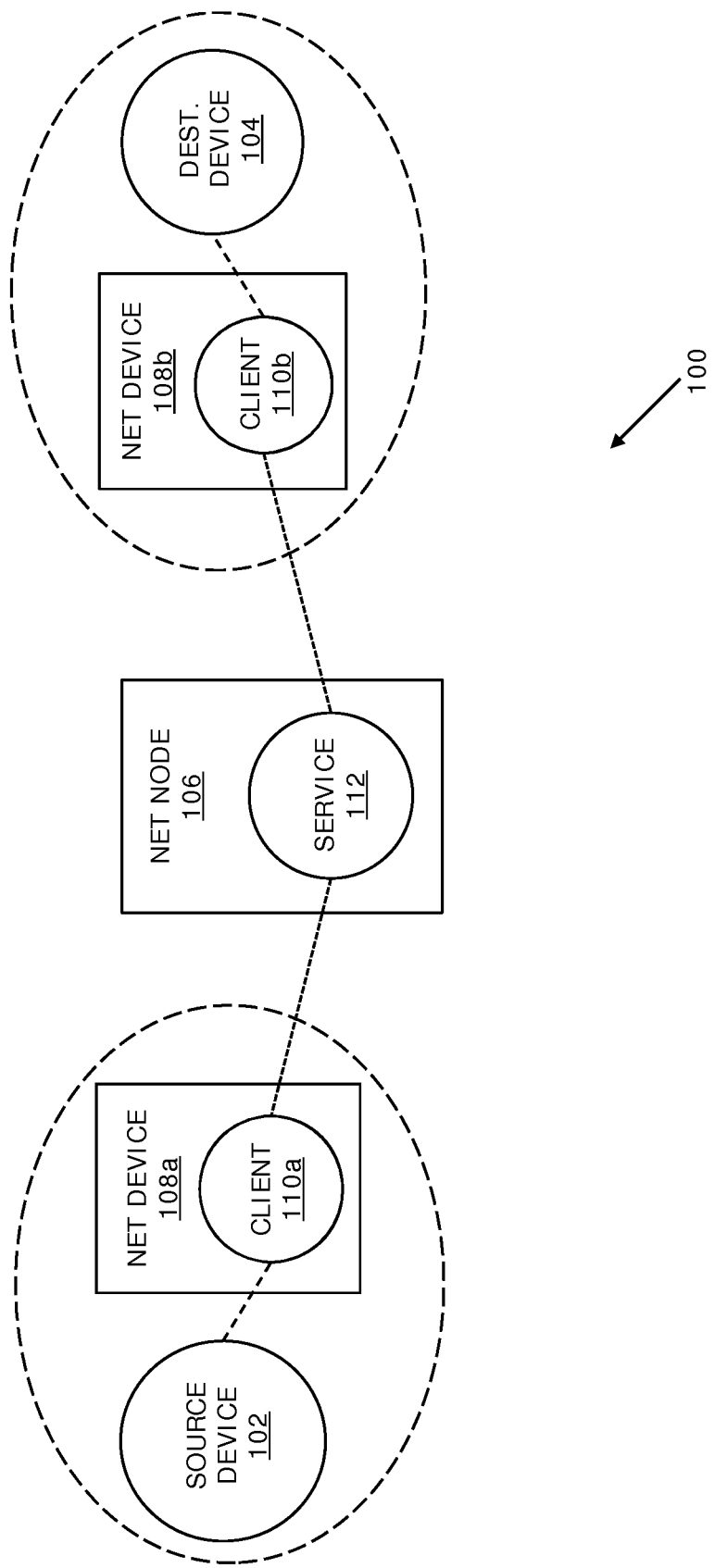
FIG. 1 is a schematic illustration of an example implementation of a system for communicating data from a source device to a destination device, in accordance with an embodiment of the present disclosure.

In the accompanying diagrams, an underlined number is employed to represent an item over which the underlined number is positioned or an item to which the underlined number is adjacent. When a number is non-underlined and accompanied by an associated arrow, the non-underlined number is used to identify a general item at which the arrow is pointing.

DETAILED DESCRIPTION OF EMBODIMENTS

In the following detailed description, illustrative embodiments of the present disclosure and ways in which they can be implemented are elucidated. Although some modes of carrying out the present disclosure are described, those skilled in the art would recognize that other embodiments for carrying out or practising the present disclosure are also possible.

In a first aspect, embodiments of the present disclosure provide a system for communicating data from a source device to at least one destination device, the source device having no direct access or having only restricted access to any data communication network, characterized in that the system comprises:
- a network device that is to be coupled in communication with the source device, so as to enable the source device to transfer to the network device the data to be communicated to the at least one destination device; and
- a network node configured to provide a network node service to a source client executing on the network device and to a destination client associated with the at least one destination device, wherein the network device is to be coupled in communication with the network node via a data communication network, and wherein the network device is communicably uncoupled from the source device prior to communicably coupling the network device to the network node, wherein the source client is configured to:
  check whether or not the destination client is connected to the network node service; and
  communicate the data to the destination client, by relaying the data through the network node service, when the destination client is connected to the network node service, wherein the data communication from the source client to the destination client does not take place, until the network device has been communicably uncoupled from the source device.

Pursuant to embodiments of the present disclosure, the network device can be coupled in communication with the source device using a wireless connection or a wired connection. Based upon the present disclosure provided herein, a person skilled in the art will recognize a variety of ways in which the aforesaid coupling can exist. As an example, the network device can be coupled in communication with the source device using a Near Field Communication (NFC) interface, a Bluetooth® Low Energy (BLE) interface, or Li-Fi. As another example, the network device can be coupled in communication with the source device using a Universal Serial Bus (USB) connection or a lightning cable.

When a USB connection is used, the source device acts as a USB host, whilst the network device acts as a USB peripheral. In this regard, the network device and the source device can be connected using a suitable USB lightning cable, depending upon a connectivity option available on the source device. Optionally, in such a case, the source client is configured to create a USB file system associated with the source device for temporarily storing the data to be communicated.

Moreover, optionally, the network device is implemented by way of a simple Single Board Computer (SBC) or System on Chip (SoC). As an example, the network device can be implemented by way of an Orange Pi® or a Raspberry Pi® type of device. It will be appreciated that the network device can be alternatively implemented by way of other types of computing devices, for example, such as smartphones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, and desktop computers.

Optionally, the network device employs Advanced RISC Machine (ARM), wherein RISC stands for "Reduced Instruction Set Computer". As an example, the network device could be implemented by way of an ARM Linux® device. As another example, the network device could be implemented by way of an ARM Android® device having only Wi-Fi®, without any telephone communication module.

Optionally, the network device is configured to be capable of acting as a data storage and performing a network file transfer. More optionally, the network device is implemented by way of a portable battery-powered device that is capable of acting as a USB mass storage and performing a network file transfer. Optionally, in this regard, the network device includes an internal memory card (for example, such as a Secure Digital (SD) card).

Optionally, when the network device is coupled with the source device using a USB connection (for example, by plugging the network device into the source device's USB port), the source device detects the network device as an external mass storage device. This allows a user of the source device to copy data into an upload directory (or from a download directory) of the network device.

Moreover, optionally, a user interface of the source device allows the user to select data files to be communicated to the at least one destination device, wherein the data files constitute at least a part of the data to be communicated. Optionally, in this regard, the user interface of the source device allows the user to copy the data files to a predefined folder or disk (for example, the upload directory) of the network device. More optionally, the user interface allows the user to drag and drop the data files to the predefined folder or disk.

Optionally, the source client is configured to identify when new data file(s) are copied into the upload directory of the network device, and to schedule a transfer of the new data files to the destination client automatically.

Furthermore, according to an embodiment, the network device is provided with an access to the data communication network (namely, the data communication network via which the network device is coupled in communication with the network node) by wired or wireless means. Optionally, in this regard, the system comprises a network-access device that, in operation, provides the network device with the access to the data communication network. Throughout the present disclosure, the term "network-access device" refers to a device that has an access to a data communication network, and is capable of providing a network device with an access to the data communication network. Such a device is configured to operate at a data link layer (OSI L2). The network-access device could, for example, be a network infrastructure device (for example, such as a router, a modem or the like) or a user device (for example, such as a personal computer, a laptop, or a smartphone) that has an access to the data communication network (for example, using a Wi-Fi, a USB Wi-Fi® dongle, a USB cellular dongle or the like).

As an example, the access to the data communication network can be provided by a wireless access point. In such a case, the network-access device could be a wireless router or a mobile communication device that uses a Wi-Fi® or a cellular network, wherein the wireless access point is provided by the wireless router or the mobile communication device.

It will be appreciated that these examples are only for illustrative purposes; a person skilled in the art will recognize many variations, alternatives, and modifications of embodiments of the present disclosure.

Optionally, the source client is configured to automatically establish a network connectivity via the network-access device, based on a predefined configuration. Optionally, the source client is configured to search for a particular (namely, predefined) data communication network and to connect to that particular data communication network automatically. Alternatively, optionally, the source client is configured to connect to any data communication network that is available.

According to another embodiment, the network device is configured to access the data communication network on its own. More optionally, the network device includes a built-in module that is configured to provide Wi-Fi® connectivity.

Throughout the present disclosure, the term "destination client" encompasses both a client executing on the at least one destination device as well as a client executing on a network device associated with the at least one destination device (namely, a network device coupled with the at least one destination device). Optionally, when the destination client is a client executing on the network device coupled with the at least one destination device, the data received from the source client is stored in a download directory of the network device coupled with the at least one destination device. It will be appreciated that the download directory can be the same as or different from an upload directory of the network device, wherein the upload directory is used when the at least one destination device acts as a source of data at a same or different instance of time.

Beneficially, when executed, the destination client is capable of performing similar functionalities as the source client. As a result, the at least one destination device can act as a source device at the same or another instance of time. Likewise, the source device can act as a destination device at the same or another instance of time.

It will be appreciated that the terms "source client" and "destination client" and the terms "source device" and "destination device" have been used for the sake of clarity only, and should not be construed to limit the terms "source client" and "source device" and the terms "destination client" and "destination device" to acts of transmitting data and receiving data, respectively. In other words, a given device may act as a source device at a given instance of time, and as a destination device at the same or another instance of time.

Examples of software platforms that are technically suitable for implementing the source client and the destination client include, but are not limited to, Unix °, Linux®, Windows®, OS X®, Android® and iOS®.

Moreover, according to an embodiment, a communication link is established between the source client and the destination client, when the destination client is connected to the network node service; this communication link is then used to communicate the data from the source client to the destination client. It will be appreciated that such a communication link is a real-time communication link. By "real-time communication link", it is meant that the data is communicated in real-time or near real-time when both the source client and the destination client are connected to the network node service. Throughout the present disclosure, the term "real-time" has been used to refer to real-time as well as near real-time; thus, the term "real-time communication link" also encompasses a near real-time communication link.

Optionally, the source client is configured to schedule transmission of the data to the destination client on a periodic basis. Optionally, in this regard, the network node service is configured to schedule the relay of the data therethrough on a periodic basis.

Optionally, in this regard, the source client is configured to check for any newly appended data files on the upload directory of the network device from time to time, and to transfer these data files when the destination client is connected to the network node service. Beneficially, the source client is configured to remove the data files from the upload directory of the network device, upon succesful transfer of the data files to the destination client. Thus, the user does not have to perform any action apart from selecting data files to be communicated to the at least one destination device.

Moreover, optionally, the source client is configured to transmit the data to the destination client in parts. As an example, the data transmission can be performed on a periodic basis, when there is a certain maximum amount of bytes that the network device can read and transmit at a time. Optionally, in such a case, the source client is configured to transmit a data block or packet (namely, the certain amount of bytes), and to pause momentarily, before resuming transmission of a next data block or packet.

Alternatively, optionally, the source client is configured to transmit the data to the destination client at one go. Optionally, in such a case, the source client is configured to transmit to the destination client the data in a form of one or more data streams.

Furthermore, in the foregoing, by "no direct access" is meant that the source device is not capable of being, or is not desired to be, coupled directly to any data communication network by means of a wired or wireless connection.

In the foregoing, by "only restricted access" is meant that the source device is capable of being coupled directly to a given data communication network, but for some reason, is not able to access the given data communication network at a given point of time.

In some implementations, the term "restricted access" means that the source device is not allowed to access any data communication network. In other implementations, the term "restricted access" means that the source device is allowed to access only a particular communication network (for example, a local area network of an organization or a virtual private network), whereby the source device is unable to communicate data to the at least one destination device from outside that particular communication network.

Pursuant to embodiments of the present disclosure, irrespective of whether or not the source device is capable of being coupled to a data communication network (for example, the Internet), the source device does not access any data communication network for communicating the data; instead, the data is communicated by the network device on behalf of the source device. Examples of the source device include, but are not limited to, a smart telephone, a smart watch, a Personal Computer (PC), an On-Board Diagnostics (OBD) device of a vehicle, a camera, a data storage device, a medical apparatus, a seismic apparatus, a surveying apparatus, a "black box" flight recorder, a digital musical instrument.

The aforementioned system can be implemented even in a highly-restricted environment, where it is not possible to communicate with communication devices using conventional techniques. One example of such a highly-restricted environment is a local area network of a company or an organization, wherein communication devices from within the local area network have a restricted access to the public Internet®, due to existing physical and/or non-physical network security infrastructure, for example, such as firewalls, proxies and the like. The system pursuant to embodiments of the present disclosure is capable of facilitating data communication from such communication devices (namely, source devices), without affecting the existing physical and/or non-physical network security infrastructure.

More optionally, the network device is communicably uncoupled from the source device prior to being communicably coupled to any data communication network.

As an example, when the network device is physically coupled with (namely, plugged to) the source device, for example, using a USB connection, the data communication does not take place, until the network device has been unplugged from the source device. This potentially isolates the source device from the data communication network via which the network device is coupled to the network node. In such implementations, the network device provides isolated protection to the source device. By "isolated protection", it is meant that the source device is not connected to the data communication network (for example, the public Internet), and therefore, is not vulnerable to virus attacks and other kinds of threats. As a result, there is no need to employ firewalls or other security policies for the source device.

Optionally, in such a case, the source client is configured to switch between a data storage mode and a data transfer mode of the network device depending on whether or not the network device is communicably uncoupled from the source device. Throughout the present disclosure, the term "data transfer mode" encompasses both transmission and receipt of data; therefore, the term "data transfer mode" has been used not only with respect to a network device associated with a given source device, but also with respect to a network device associated with a given destination device. One example implementation of how the data storage mode and the data transfer mode can be used has been provided in conjunction with FIGS. 3A and 3B.

For illustration purposes only, there will now be considered an example implementation in which the network device includes an internal SD card. In the example implementation, when the network device is coupled to the source device (for example, via a USB connection), the source client is configured to switch the network device to the data storage mode, thereby allowing the user to copy data files into the upload directory or from the download directory of the network device. As an example, the data files may be copied into a USB file system that has been created for the source device on a USB Mass Storage (UMS) of the network device.

In the data storage mode, a connection to the network node service is disconnected and the SD card of the network device is unmounted automatically. As a result, the network device provides isolated protection to the source device, and there is no possibility for leakage of data anywhere.

On the other hand, when the network device is uncoupled (for example, unplugged) from the source device, the source client is configured to switch the network device to the data transfer mode. In the data transfer mode, the SD card of the network device is mounted automatically and a connection to the network node service is re-established. Moreover, the source client is configured to identify any newly appended data files on the upload directory of the network device, and to transfer these data files when the destination client is connected to the network node service. Beneficially, the source client is configured to remove the data files from the upload directory of the network device, upon succesful transfer of the data files to the destination client.

Moreover, it will be appreciated that the aforementioned system can be implemented even in non-restricted or non-secured network environments, for example, such as public-accessible networks provided at public places (for example, such as libraries). In other words, the system pursuant to the present disclosure can be implemented for performing data communication in a secure manner, even with the help of a non-personal computer located at a public library, for example, when the network device uses a network connection of the non-personal computer (namely, the aforementioned network-access device) to access the data communication network. There is no need to install any software to such a non-personal computer (namely, the network-access device), the network device only uses the non-personal computer's access to the data communication network. Moreover, when such a non-personal computer's access is utilized, the data is transferred without leaving any trace thereto. It will be appreciated that installing any software on such non-personal computers, namely computers available for the public in public libraries, is typically forbidden; the aforementioned system is capable of performing secure data transmission without a need to install any software to such non-personal computers.

Instead, a software application or program (namely, the client) is executed only on the network device. In other words, there is no need to install any specific software application or program to, for example, a computer or a mobile communication device (namely, the network-access device) whose access to the data communication network is being used by the network device.

Moreover, pursuant to embodiments of the present disclosure, no specific software application or program is required to be installed to the source device.

Pursuant to the present disclosure, the data communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet®, second generation (2G®) telecommunication networks, third generation (3G®) telecommunication networks, fourth generation (4G®) telecommunication networks, fifth generation (5G®) telecommunication networks, community networks, satellite networks, vehicular networks, sensor networks, Worldwide Interoperability for Microwave Access (WiMAX®) networks, and short-range wireless communication networks, such as a "Bluetooth" network ("Bluetooth" is a registered Trademark®). Such networks may run the Internet Protocol (IP), an information-centric protocol, or other protocols to achieve a desired data communication.

In some implementations, the data communication network is the Internet®.

It will be appreciated that the network node may be communicably coupled to the at least one destination device, via another data communication network. In some implementations, such a data communication network is a local network that is created by communicably and only programmatically coupling destination clients associated with one or more destination devices to the network node service provided by the network node. One such local network has been illustrated in conjunction with FIG. 1. Optionally, in such a local network, the clients communicate with each other via relay through the network node service. It will be appreciated that the clients are only programmatically coupled around the network node service in a programmatic star configuration, and need not be physically arranged in a star network topology.

Hereinabove, the term "local network" refers to a local transmission network that interacts directly with clients, without requiring any outside transmission network. Optionally, the local transmission network is created by implementing an application layer (OSI L7). Optionally, in such a case, the network node is configured to operate at the application layer (OSI L7). Additionally or alternatively, optionally, the local transmission network utilizes existing network infrastructure hardware (for example, such as routers). Notably, an outside transmission network is typically required to transfer data between two or more local transmission networks.

Throughout the present disclosure, the term "network node" refers to a network node that is operable to provide a network node service to serve clients executing on network devices associated with the network node. The network node could be implemented either by way of a data communication equipment (for example, such as a modem, hub and the like) or by way of a data terminal equipment (for example, such as a router, a computer, a smartphone and the like). Optionally, the network node is implemented by way of a programmatic hub or a programmatic router. Alternatively, optionally, the network node is implemented in a data center.

It will be appreciated that the network node is never implemented in a source device.

Embodiments of the present disclosure are susceptible to being employed in a wide range of systems, for example, such as smart telephones, smart watches, Personal Computers (PC's), vehicles, audio-visual apparatus, cameras, data storage devices, surveillance systems, video conferencing systems, medical apparatus, seismic apparatus, surveying apparatus, "black box" flight recorders, digital musical instruments, but not limited thereto.

As an example, the aforementioned system can be implemented for transferring one or more medical images from a medical imaging device or a computer associated with the medical imaging device (namely, the source device in this case) to at least one destination device located far away from the medical imaging device, for analysis or research purposes. For example, the at least one destination device could be another computer where a medical analysis of the one or more medical images is to be performed. In such an instance, the network device is coupled to the medical imaging device or the associated computer, whereby a user then selects the medical images to be transferred and copies the medical images to the upload directory of the network device. Subsequently, the source client schedules the transfer of the medical images to the destination client.

The destination client could be a destination client executing on the at least one destination device or a destination client executing on a network device associated with the at least one destination device. Notably, when the at least one destination device has no direct access or has only restricted access to any data communication network, the network device is beneficially employed to receive the medical images transferred by the source client. One such example implementation has been illustrated later in conjunction with FIG. 2.

Moreover, it will be appreciated that the term "destination device" not only encompasses endpoint devices owned by users, but also encompasses a data storage system of a cloud service provider or a file hosting service (for example, such as Dropbox®). The aforementioned system could be implemented to transfer the data to a cloud storage system from where endpoint devices can retrieve the data as and when required. When the aforementioned system is implemented to transfer the data to such a cloud storage system (for example, such as Dropbox®), there is no need to install any software (namely, software related to the cloud storage system) to a device whose access to the data communication network (for example, internet access) is utilized in transferring the data, unlike in the Dropbox® scenario.

It will be appreciated that a given network node service can be installed at a fixed physical location or a physically moving object. Examples of such moving objects include, but are not limited to, vehicles, smart telephones carried by their users, smart watches carried by their users, and other wearable devices.

Furthermore, pursuant to embodiments of the present disclosure, even when being relayed through the network node service, the data is not stored at the network node.

Moreover, optionally, the source client is configured to employ at least one encoding method to encode the data, and to communicate the data in encoded form. Optionally, in such a case, when the data is communicated in the encoded form, the destination client is configured to employ at least one decoding method to decode the data.

Optionally, the data is communicated using end-to-end encryption. Optionally, in this regard, the source client is configured to encrypt information content of the data prior to communicating the data to the destination client. In such a case, the destination client is configured to decrypt the data upon receipt.

Optionally, in this regard, the information content of the data is encrypted by using one or more content encryption methods. Optionally, the content encryption is achieved by using a form of symmetrical encryption, block cipher algorithm (see https://en.wikipedia.org/wiki/Block cipher), for example, such as Advanced Encryption Standard (AES). Alternatively, optionally, the content encryption is achieved by using a stream cipher algorithm (see https://en.wikipedia.org/wiki/Stream cipher), for example, such as ChaCha algorithm. Such content encryption enables the aforementioned system to function reliably and handle the data in a manner that it is content-protected in respect of an owner of the data, namely one or more parties that are authorized to access and use the data in question. It will be appreciated that the content encryption can alternatively be achieved by using suitable asymmetrical encryption techniques (for example, such as RSA).

Optionally, the source client is configured to employ a key store to encrypt the information content of the data prior to communicating the data to the destination client. Optionally, in this regard, the source client is configured to employ at least one key that is stored in the key store to encrypt the information content of the data.

Optionally, the source client is configured to communicate to the destination client, together with the data, encryption information indicative of a unique identifier (ID) of the key store and a key index of a key to be derived from the key store for subsequent decryption of the encrypted information content. It will be appreciated that there can be a plurality of key stores associated with the source client; in such a case, the unique ID of the key store identifies which key store from amongst the plurality of key stores is to be used for encryption/decryption purposes. Accordingly, identical or mutually compatible copies of the key store are provided to the source client and to the destination client associated with the at least one destination device.

Optionally, the identical or mutually compatible copies of the key store are provided to the source client and the destination client by the network node service executing on the network node. Alternatively, optionally, the identical or mutually compatible copies of the key store are provided by a trusted third party.

It will be appreciated that no harm arises even if the encrypted information content is accessed by unauthorized parties, because the unauthorized parties do not have access to the relevant key store and its keys. In other words, the system pursuant to the present disclosure provides improved protection, as optionally the data is stored in an encrypted form at both endpoints, namely the source client and the destination client, thereby providing an end-to-end encryption.

Optionally, the key store is implemented by way of a key container or a key generator that is capable of storing keys and/or generating keys based upon their key indexes in a reproducible manner. By "reproducible", it means that a same key is generated from a given key index reproducibly. As an example, the key store can be implemented as described in a UK patent document GB2538052. As another example, the key store can be implemented as described in a UK patent document GB 1620553.6.

Optionally, in the network device, the source client is integrated with the key store, such that only the source client is allowed to access the key store and use the keys stored or generated therein. Optionally, once integrated with the key store, the source client is executed with protection from a kernel of the network device.

Furthermore, optionally, the source client is configured to communicate, together with the data, information indicative of the at least one destination device or the destination client to which the data is to be communicated.

It will be appreciated that the information indicative of the at least one destination device or the destination client is not required to be communicated in cases where a same network node is reserved for communicating within a predefined group of network devices.

In some implementations, the network node could be inter-connected with one or more other network nodes having their own local networks. In other words, the one or more other network nodes could be coupled to their corresponding network devices, thereby creating their own local networks. In such a case, when two given network nodes are inter-connected, their corresponding local networks are connected to form a large data communication network, wherein communication occurs via relay through the two given network nodes.

Optionally, the source client is configured to communicate the encryption information and the information indicative of the at least one destination device or the destination client by way of metadata associated with the data. Such metadata enables the aforementioned system to perform a fast and reliable data delivery to the destination client, namely in real or near real time.

According to an embodiment, the metadata is communicated in an unencrypted form. In such a case, the network node service is configured to deliver (namely, relay) the encrypted information content of the data to desired parties, namely the destination client, based upon the metadata, without a need to process the encrypted information content. In other words, only the information content of the data, which may contain sensitive information, is encrypted; the network node service does not need to decrypt the encrypted information content and re-encrypt it. As a result, the network node service does not compromise any sensitive information in respect of the owner of the data. It will be appreciated that the network node providing the network node service can be implemented in any kind of environment using any kind of device that need not have any security enhancements for protecting the data.

According to another embodiment, the metadata is communicated in an encrypted form. In such a case, it is required that the network node service is configured to have its own key store and suitable security modules associated with the key store for protecting the key store from unauthorized access and use, wherein the security module is configured to perform actual encryption and decryption operations. This requires hardware-isolated security features from the network node executing the network node service. It will be appreciated that communicating the metadata in the encrypted form is particularly beneficial when it is desired to hide tracking information, so that it would not be possible for an eavesdropping third party to realize what type of data streams are being communicated and with whom the communication is occurring.

Moreover, optionally, the network node service executing on the network node is configured to register the source client and to associate unique account information with the source client. Optionally, the unique account information is to be used to validate and authenticate the source client prior to communicating the data. Optionally, in this regard, the network node service is configured to validate and authenticate the source client with accepted credentials, namely the unique account information provided by the source client, when the source client connects to the network node service.

Furthermore, optionally, the source client or another client executing on the network device is configured to provide a user interface for allowing the user to observe progress of the data communication. Such a user interface could be provided by way of a dedicated software application or a web-browser.

It will be appreciated that in case the established real-time communication link is broken suddenly, for some reason, before all data files (namely, the data to be communicated) have been transmitted to the destination client, the source client is configured to resume transmission of the remaining data files (namely, data files that have not been transmitted yet) when the real-time communication link is re-established. In practice, such a "resume" function is enabled by dividing a given data file into multiple parts (for example, such as data blocks or packets), of which missed parts (namely, parts that have not been transmitted yet) are then easy to be identified and transmitted when possible. This makes the system pursuant to the present disclosure very fault-tolerant and reliable.

Additionally, optionally, the user interface allows the user to define the at least one destination device or the destination client to which the data is to be communicated. Optionally, the user interface allows the user to create a list of one or more destination devices to which the data is to be communicated. More optionally, the user interface allows the user to add one or more new destination devices to the list and/or to remove one or more existing destination devices from the list.

In a second aspect, embodiments of the present disclosure provide a method of communicating data from a source device to at least one destination device, the source device having no direct access or having only restricted access to any data communication network, the method being implemented by a system comprising a network node and a network device, characterized in that the method comprises:
coupling the network device in communication with the source device to enable the source device to transfer to the network device the data to be communicated to the at least one destination device;
coupling the network device in communication with the network node via a data communication network;
communicably uncoupling the network device from the source device prior to communicably coupling the network device to the network node;
providing, via the network node, a network node service to a source client executing on the network device and to a destination client associated with the at least one destination device;
checking whether or not the destination client is connected to the network node service; and
communicating the data from the source client to the destination client, by relaying the data through the network node service, when the destination client is connected to the network node service, wherein the data communication from the source client to the destination client does not take place, until the network device has been communicably uncoupled from the source device.

Various embodiments and variants disclosed above apply mutatis mutandis to the method.

Optionally, the method comprises executing the source client to switch between a data storage mode and a data transfer mode of the network device depending on whether or not the network device is communicably uncoupled from the source device.

Optionally, the method comprises executing the source client to schedule transmission of the data to the destination client on a periodic basis.

Optionally, the system further comprises a network-access device having an access to the data communication network, wherein the method comprises providing the network device with an access to the data communication network, via the network-access device.

Optionally, the method comprises executing the source client to employ a key store to encrypt information content of the data prior to communicating the data to the destination client, as described earlier. In this regard, identical or mutually compatible copies of the key store are provided to the source client and to the destination client.

Optionally, the method comprises executing the network node service on the network node to register the source client and to associate unique account information with the source client, wherein the unique account information is to be used to validate and authenticate the source client prior to communicating the data.

Optionally, the method comprises executing the source client or another client on the network device to provide a user interface for allowing a user to observe progress of the data communication. The user interface may be used to provide also other options to the user, for example, as described earlier.

In a third aspect, embodiments of the present disclosure provide a network device for communicating data from a source device to at least one destination device, the source device having no direct access or having only restricted access to any data communication network, characterized in that:
the network device is to be coupled in communication with the source device, so as to enable the source device to transfer to the network device the data to be communicated to the at least one destination device;
the network device is to be coupled in communication with a network node via a data communication network, wherein the network device is communicably uncoupled from the source device prior to communicably coupling the network device to the network node, and wherein the network node is configured to provide a network node service to a source client executing on the network device and to a destination client associated with the at least one destination device; and
the source client is configured to check whether or not the destination client is connected to the network node service, and to communicate the data to the destination client, by relaying the data through the network node service, when the destination client is connected to the network node service, wherein the data communication from the source client to the destination client does not take place, until the network device has been communicably uncoupled from the source device.

Various embodiments and variants disclosed above apply mutatis mutandis to the network device.

Optionally, the source client is configured to switch between a data storage mode and a data transfer mode of the network device depending on whether or not the network device is communicably uncoupled from the source device.

Optionally, the source client is configured to schedule transmission of the data to the destination client on a periodic basis.

Optionally, the network device is provided with an access to the data communication network, via a network-access device. Alternatively, optionally, the network device is configured to access the data communication network on its own.

Optionally, the source client is configured to employ a key store to encrypt information content of the data prior to communicating the data to the destination client, wherein identical or mutually compatible copies of the key store are provided to the source client and to the destination client.

Optionally, the network device and the source device are coupled in communication via a Universal Serial Bus (USB) connection, wherein the source device acts as a USB host, whilst the network device acts as a USB peripheral.

Next, embodiments of the present disclosure will be described with reference to figures.

FIG. 1 is a schematic illustration of an example implementation of a system 100 for communicating data from a source device 102 to a destination device 104, in accordance with an embodiment of the present disclosure. With reference to FIG. 1, both of the source device 102 and the destination device 104 do not have direct access or have only restricted access to any data communication network.

The system 100 includes a network node 106 and network devices 108a and 108b. Clients 110a and 110b executing on the network devices 108a and 108b, respectively, are provided with a network node service 112 executing on the network node 106.

The network device 108a is to be coupled in communication with the source device 102, so as to enable the source device 102 to transfer to the network device 108a the data to be communicated to the destination device 104. On the other hand, the network device 108b is to be coupled in communication with the destination device 104.

The client 110a (namely, a source client) is configured to check whether or not the client 110b (namely, a destination client) is connected to the network node service 112, and to communicate the data to the client 110b, by relaying the data through the network node service 112, when the client 110b is connected to the network node service 112. The client 110b is configured to provide the data to the destination device 104.

FIG. 1 is merely an example, which should not unduly limit the scope of the claims herein. A person skilled in the art will recognize many variations, alternatives, and modifications of embodiments of the present disclosure.

Figure 2:
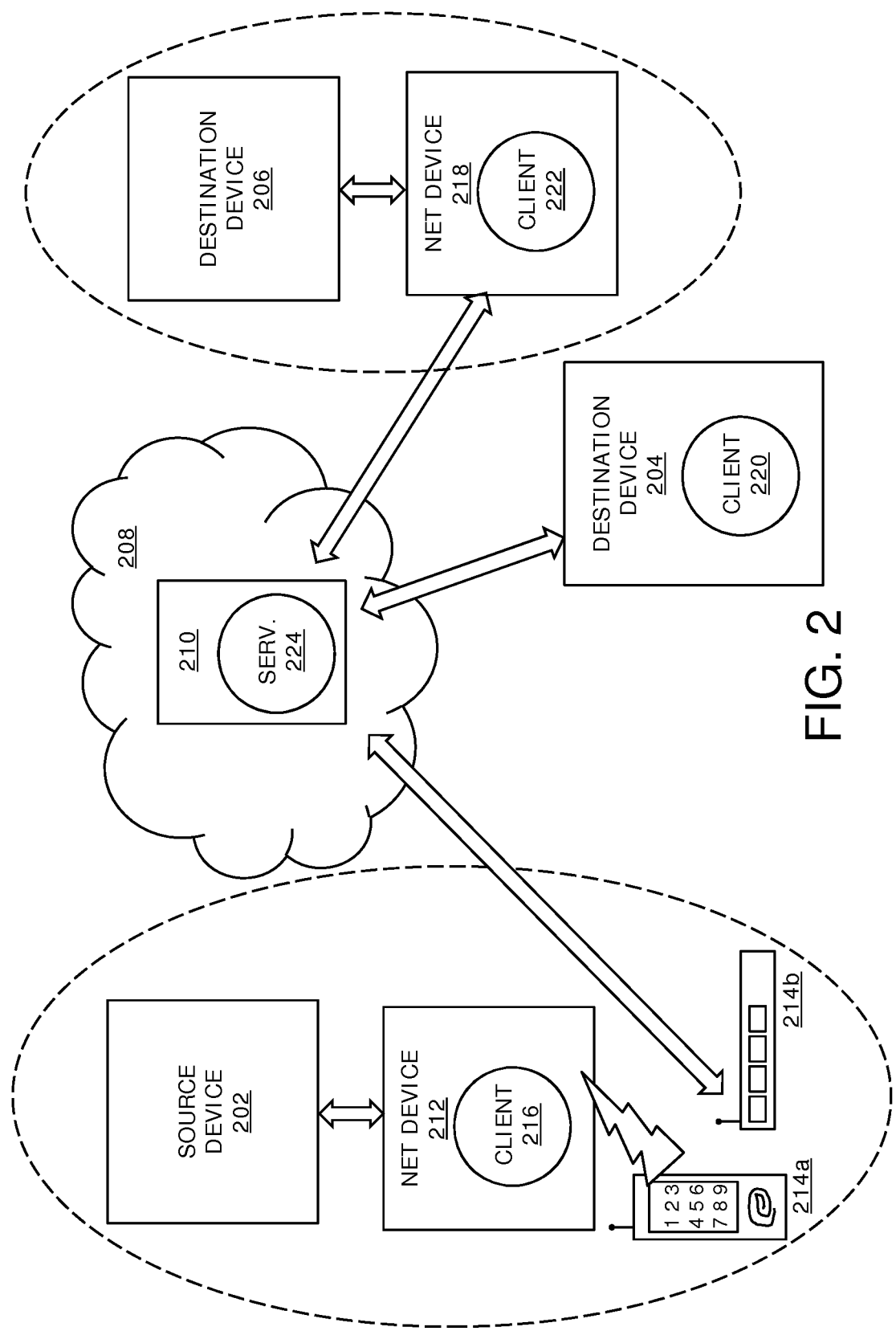
FIG. 2 is a schematic illustration of another example implementation of a system for communicating data from a source device to one or more destination devices, in accordance with an embodiment of the present disclosure.

FIG. 2 is a schematic illustration of another example implementation of a system for communicating data from a source device 202 to destination devices 204 and 206, in accordance with an embodiment of the present disclosure. With reference to FIG. 2, the source device 202 and the destination device 206 have no direct access or have only restricted access to any data communication network, whereas the destination device 204 has access to a data communication network 208, for example, such as the public Internet. It will be appreciated that the destination devices 204 could be a data storage system of a cloud service provider, or a file hosting service, for example, such as Dropbox®.

With reference to FIG. 2, the system includes a network node 210 and a network device 212. The network device 212 is to be coupled in communication with the source device 202, so as to enable the source device 202 to transfer to the network device 212 the data to be communicated to the destination devices 204 and 206.

The network device 212 is to be coupled in communication with the network node 210 via a data communication network (which may be same as or different from the data communication network 208). With reference to FIG. 2, the network device 212 accesses this data communication network using a wireless access point provided by a network-access device 214a. The network-access device 214a is optionally implemented by way of a smartphone. Beneficially, a user associated with the smart phone enables a wireless access point on the smartphone on a temporary basis, thereby enabling a source client 216 (executing on the network device 212) to access the data communication network on a temporary basis. It will be appreciated that a smartphone is just one example of possible devices capable of being used for providing access to the data communication network. For example, there is optionally provided a router 214b as another network-access device.

With reference to FIG. 2, the network node 210 has access to the data communication network 208.

In FIG. 2, the destination device 204 does not have any network device associated therewith, while the destination device 206 has a network device 218 associated therewith. A destination client 220 is executed on the destination device 204, while a destination client 222 is executed on the network device 218 associated with the destination device 206.

The network device 218 is to be coupled in communication with the destination device 206, so as to enable the destination device 206 to copy from the network device 218 the data received from the source device 202.

The network device 212, the destination device 204 and the network device 218 are to be coupled in communication with the network node 210, such that the source client 216 (executing on the network device 212), the destination client 220 (executing on the destination device 204) and the destination client 222 (executing on the network device 218), respectively, are connected to a network node service 224 executing on the network node 210.

The source client 216 is configured to check whether or not the destination clients 220 and 222 associated with the destination devices 204 and 206, respectively, are connected to the network node service 224, and to communicate the data to the destination clients 220 and 222, by relaying the data through the network node service 224, when the destination clients 220 and 222 are connected to the network node service.

It will be appreciated that the destination clients 220 and 222 need not be connected to the network node service 224 at the same instant of time. In operation, the source client 216 communicates the data to the destination client 220 at a first instance of time, and to the destination client 222 at a second instance of time. The first instance of time may or may not be the same as the second instance of time.

With reference to FIG. 2, the network node 210 is optionally implemented in a data center.

The data communication from the source client 216 to the destination client 220 does not take place, until the network device 212 has been communicably uncoupled from the source device 202. As a result, the network device 212 isolates the source device 202 from a connection to the data communication network that is provided via the wireless access point, thereby providing isolated protection to the source device 202. Likewise, the data communication from the source client 216 to the destination client 222 does not take place, until the network devices 212 and 218 have been communicably uncoupled from the source device 202 and the destination device 206, respectively. As a result, the network device 218 isolates the destination device 206 from a connection to the data communication network 208, thereby providing isolated protection to the destination device 206. In other words, the source device 202 and the destination device 206 are not connected to the data communication network (for example, the public Internet) and the data communication network 208, respectively, and therefore, are not vulnerable to virus attacks and other kinds of threats. As a result, there is no need to employ firewalls or other security policies for the source device 202 and the destination device 206.

Upon successful completion of the data communication, the user may disable the wireless access point on the smartphone.

FIG. 2 is merely an example, which should not unduly limit the scope of the claims herein. A person skilled in the art will recognize many variations, alternatives, and modifications of embodiments of the present disclosure.

FIGS. 3A and 3B are a schematic illustrations of how a network device 302 is used to communicate data from a source device 304 to a destination device 306 in different scenarios, in accordance with an embodiment of the present disclosure.

A source client executing on the network device 302 is configured to switch between a data storage mode and a data transfer mode of the network device 302, depending on whether or not the network device 302 is communicably uncoupled from the source device 304. The network device 302 operates in the data storage mode, when the network device 302 is communicably coupled with the source device 304. When the network device 302 is communicably uncoupled from the source device 304, the network device 302 operates in the data transfer mode.

With reference to FIG. 3A, the source device 304 has no direct access or has only restricted access to any data communication network, while the destination device 306 has a direct access to a data communication network. Therefore, the network device 302 is used with the source device 304 to communicate the data to the destination device 306, by relaying the data through a network node service provided by a network node 308.

With reference to FIG. 3B, neither the source device 304 nor the destination device 306 have direct access or have only restricted access to any data communication network. Therefore, the network device 302 and a network device 310 are used with the source device 304 and the destination device 306 to communicate the data from the source device 304 to the destination device 306, by relaying the data through the network node service.

In such a case, a destination client executing on the network device 310 is configured to switch between a data storage mode and a data transfer mode of the network device 310, depending on whether or not the network device 310 is communicably uncoupled from the destination device 306. When the network device 310 is communicably uncoupled from the destination device 306, the network device 310 operates in the data transfer mode. The network device 310 operates in the data storage mode, when the network device 310 is communicably coupled with the destination device 306.

FIG. 3 is merely an example, which should not unduly limit the scope of the claims herein. A person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural; as an example, "at least one of" indicates "one of" in an example, and "a plurality of" in another example; moreover, "one or more" is to be construed in a likewise manner.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

We claim:

1. A system for communicating data from a source device to at least one destination device, the source device having no direct access or having only restricted access to any data communication network, wherein the system --comprises:
   a network device configured to be coupled in communication with the source device to enable the source device to transfer to the network device the data to be communicated to the at least one destination device; and
   a network node configured to provide a network node service to a source client executing on the network device and to a destination client associated with the at least one destination device, wherein the network device is configured to be coupled in communication with the network node via a data communication network, and wherein the network device is configured to be communicably uncoupled from the source device prior to communicably coupling with the network node,
   wherein the source client is configured to:
   check whether or not the destination client is connected to the network node service; and
   communicate the data to the destination client by relaying the data through the network node service when the destination client is connected to the network node service;
   wherein the data communication from the source client to the destination client does not take place until the network device has been communicably uncoupled from the source device.

2. The system of claim 1, wherein the source client is configured to switch between a data storage mode and a data transfer mode of the network device depending on whether or not the network device is communicably uncoupled from the source device.

3. The system of claim 1, wherein the source client is configured to schedule transmission of the data to the destination client on a periodic basis.

4. The system of claim 1, wherein the system comprises a network-access device that in operation, provides the network device with an access to the data communication network.

5. The system of claim 1, wherein the source client is configured to employ a key store to encrypt information content of the data prior to communicating the data to the destination client, wherein identical or mutually compatible copies of the key store are provided to the source client and to the destination client.

6. The system of claim 1, wherein the network node service executing on the network node is configured to register the source client and to associate unique account information with the source client, wherein the unique account information is to be used to validate and authenticate the source client prior to communicating the data.

7. The system of claim 1, wherein the source client or another client executing on the network device is configured to provide a user interface for allowing a user to observe progress of the data communication.

8. The system of claim 1, wherein the network device and the source device are coupled in communication via a Universal Serial Bus (USB) connection, wherein the source device acts as a USB host, whilst the network device acts as a USB peripheral.

9. The system of claim 1, wherein the data communication network is the Internet®.

10. A method of communicating data from a source device to at least one destination device, the source device having no direct access or having only restricted access to any data communication network, the method being implemented by a system comprising a network node and a network device, wherein the method comprises:
coupling the network device in communication with the source device to enable the source device to transfer to the network device the data to be communicated to the at least one destination device;
coupling the network device in communication with the network node via a data communication network;
communicably uncoupling the network device from the source device prior to communicably coupling the network device to the network node;
providing, via the network node, a network node service, to a source client executing on the network device and to a destination client associated with the at least one destination device;
checking whether or not the destination client is connected to the network node service; and
communicating the data from the source client to the destination client, by relaying the data through the network node service, when the destination client is connected to the network node service;
wherein the data communication from the source client to the destination client does not take place, until the network device has been communicably uncoupled from the source device.

11. The method of claim 10, wherein the method comprises executing the source client to switch between a data storage mode and a data transfer mode of the network device depending on whether or not the network device is communicably uncoupled from the source device.

12. The method of claim 10, wherein the method comprises executing the source client to schedule transmission of the data to the destination client on a periodic basis.

13. The method of claim 10, wherein the system further comprises a network-access device having an access to the data communication network, wherein the method comprises providing the network device with an access to the data communication network, via the network-access device.

14. The method of claim 10, wherein the method comprises executing the source client to employ a key store to encrypt information content of the data prior to communicating the data to the destination client , wherein identical or mutually compatible copies of the key store are provided to the source client and to the destination client .

15. The method of claim 10, wherein the method comprises executing the network node service on the network node to register the source client and to associate unique account information with the source client, wherein the unique account information is to be used to validate and authenticate the source client prior to communicating the data.

16. The method of claim 10, wherein the method comprises executing the source client or another client on the network device to provide a user interface for allowing a user to observe progress of the data communication.

17. A network device for communicating data from a source device to at least one destination device, the source device having no direct access or having only restricted access to any data communication network, wherein:
the network device is to be coupled in communication with the source device so as to enable the source device to transfer to the network device the data to be communicated to the at least one destination device;
the network device is to be coupled in communication with a network node via a data communication network, wherein the network device is communicably uncoupled from the source device prior to communicably coupling the network device to the network node, and wherein the network node is configured to provide a network node service to a source client executing on the network device and to a destination client associated with the at least one destination device; and
the source client is configured to check whether or not the destination client is connected to the network node service and to communicate the data to the destination client by relaying the data through the network node service when the destination client is connected to the network node service;
wherein the data communication from the source client to the destination client does not take place, until the network device has been communicably uncoupled from the source device.

18. The network device of claim 17, wherein the source client is configured to switch between a data storage mode and a data transfer mode of the network device depending on whether or not the network device is communicably uncoupled from the source device.

19. The network device of claim 17, wherein in that the source client is configured to schedule transmission of the data to the destination client on a periodic basis.

20. The network device of claim 17, wherein the network device is provided with an access to the data communication network, via a network-access device.

21. The network device of claim 17, wherein the source client is configured to employ a key store to encrypt information content of the data prior to communicating the data to the destination client, wherein identical or mutually compatible copies of the key store are provided to the source client and to the destination client .

22. The network device of claim 17, wherein the network device and the source device are coupled in communication via a Universal Serial Bus (USB) connection, wherein the source device acts as a USB host, whilst the network device acts as a USB peripheral.

* * * * *